(12) United States Patent
Pimenta et al.

(10) Patent No.: US 6,304,934 B1
(45) Date of Patent: Oct. 16, 2001

(54) COMPUTER TO FIELDBUS CONTROL SYSTEM INTERFACE

(75) Inventors: Alexandre Pimenta; Claudene Paravela, Jr.; Delcio Prizon, all of Sertãozinho; Geraldo Sergio Zanarotti, Dumont; Lellis Do Amaral Campos, Jr., Bebedouro, all of (BR)

(73) Assignee: Smar Research Corporation, Ronkonkoma, NY (US)

( * ) Notice: Subject to any disclaimer, the term of this patent is extended or adjusted under 35 U.S.C. 154(b) by 935 days.

(21) Appl. No.: 08/542,591

(22) Filed: Oct. 13, 1995

(51) Int. Cl.$^7$ .................................................... G06F 13/00
(52) U.S. Cl. ............................................ 710/129; 710/62
(58) Field of Search .................................. 710/126–130, 710/62–74

(56) References Cited

U.S. PATENT DOCUMENTS

| | | | |
|---|---|---|---|
| 4,791,356 | * 12/1988 | Warren et al. | 324/73.1 |
| 5,313,642 | * 5/1994 | Seigel | 395/750 |
| 5,341,496 | * 8/1994 | Middledorp et al. | 395/181 |
| 5,412,643 | * 5/1995 | Kogure | 370/24 |
| 5,442,639 | * 8/1995 | Crowder et al. | 371/20.1 |
| 5,458,048 | * 10/1995 | Hohner | 91/459 |
| 5,522,043 | * 5/1996 | Fukunaga | 395/200.01 |

OTHER PUBLICATIONS

Fieldbus Foundation™, Fieldbus Specification, Function Block Application Process—Part 1, FF–94–890, Revision PS 1.0, Apr. 27, 1995.
Fieldbus Foundation™, Fieldbus Specification, Function Block Application Process—Part 2, FF–94–891, Revision PS 1.0, Apr. 27, 1995.
Instrument Society of America, Fieldbus Standard for Use in Industrial Control Systems, Part 2: Physical Layer Specification and Service Definition, pp. 38–51, 1992.

* cited by examiner

*Primary Examiner*—Sumati Lefkowitz
(74) *Attorney, Agent, or Firm*—Kenyon & Kenyon

(57) ABSTRACT

An interface device for interfacing a computer to a Fieldbus control system thereby allowing the computer to configure, control, and monitor components such as sensors and actuators which are coupled to the Fieldbus. The interface device connects to a serial port of the computer and to a Fieldbus, providing the necessary formatting of data and conditioning of signals exchanged between the Fieldbus and the computer. The interface device is powered entirely or partially from the computer via the serial port and thus does not further load a Fieldbus to which it is connected. The interface device is also portable and is thus well suited for interfacing a portable computer to a Fieldbus system in the control room or the field, e.g., close to the Fieldbus components to be monitored or controlled.

19 Claims, 3 Drawing Sheets

COMPUTER TO FIELDBUS CONTROL SYSTEM INTERFACE

FIELD OF THE INVENTION

The present invention relates to control systems and, more particularly, to methods and apparatus for interfacing a computer to a Fieldbus control system or network.

BACKGROUND INFORMATION

Industrial process control systems are used to control a variety of manufacturing and processing systems. To be effective, process control systems must be capable of operating reliably under a wide range of extreme and often hostile environments both in terms of physical as well as electromagnetic conditions.

Modern process control systems often comprise a variety of smart devices, such as control valves, pressure and temperature sensors and flow meters. Smart devices are generally considered to be those that include CPUs and which are therefore capable of processing control or measured information, e.g., from a sensor.

Fieldbus is a two wire, bidirectional digital communication arrangement that interconnects smart field devices to each other, to control systems and/or to instruments located in a control room. References herein to a Fieldbus refer to a bus operating according to a Fieldbus protocol. The Fieldbus communications protocol is described in FIELD-BUS FOUNDATION™, Fieldbus Specification, Function Block Application Process, Parts 1 and 2, Revision PS 1.0, Apr. 27, 1995 which is hereby expressly incorporated by reference. It should be noted that while the cited Fieldbus Specification documents are useful in providing an understanding of the Fieldbus protocol, they are not prior art to the present application.

The Fieldbus digital communications protocol allows communication among a variety of smart devices, such as transmitters, valves, local controllers, sensors, etc. The Fieldbus protocol, which uses digital signals to communicate control information and data between networked devices, offers several advantages in terms of reliability and connectivity over the older 4–20 mA analog communications protocol previously used to network control system devices and sensors together.

In order to monitor or control devices coupled together by a Fieldbus as part of a network, it is often desirable to be able access the network at a convenient site, e.g., in the field near a sensor or control valve.

Accordingly, there is a need for a portable unit which can be easily attached to the Fieldbus of a control system, which can display Fieldbus information, and which can be used to monitor and program the various devices which comprise the control system.

Where a computer is used as part of the portable unit for monitoring and controlling devices attached to the Fieldbus of a control system, an interface device for coupling the computer to the Fieldbus is required. It is highly desirable that such an interface device be low in cost, easily portable, and be capable of reliably transmitting information over, and receiving data from, the Fieldbus.

SUMMARY OF THE INVENTION

The present invention is directed to control systems and, more particularly, to methods and apparatus for interfacing a computer to a Fieldbus and the devices coupled thereto.

In accordance with one embodiment of the present invention, a computer, for example, a laptop personal computer, is interfaced to a Fieldbus via a computer interface device. In this embodiment, the interface device couples the computer to the Fieldbus via a serial port of the computer.

In accordance with the present invention, an interface device is provided which can be used to couple a serial port of a computer directly to a Fieldbus to communicate data and other information therebetween.

In one embodiment of the interface device of the present invention, the interface device is designed to be relatively small, e.g., approximately 1½ inches wide, ¾ inch high and 4¼ inches long and capable of being plugged directly into, e.g., a standard 9-pin serial port connector of a computer. Because of the interface device's small size, it is well suited for use with both portable notebook or laptop computers as well as desktop computers.

In accordance with one embodiment of the interface device of the present invention, the interface device is powered not by the Fieldbus but by the serial port of the computer to which it is attached. In this manner, the computer interface device of the present invention can be coupled directly to a fully loaded Fieldbus with no concern for overloading the Fieldbus power supply. This feature permits the interface device of the present invention to be used, for instance, in a control room or in the field, for diagnostic and network control purposes, without first having to assess the existing load on the Fieldbus.

As will be discussed in greater detail below, the computer interface device of the present invention includes the above-described advantages over known interface systems and numerous other features which make the interface device of the present invention particularly flexible, reliable, easy to implement and well suited to the control system environment.

DETAILED DESCRIPTION OF THE DRAWINGS

Figure 1A:
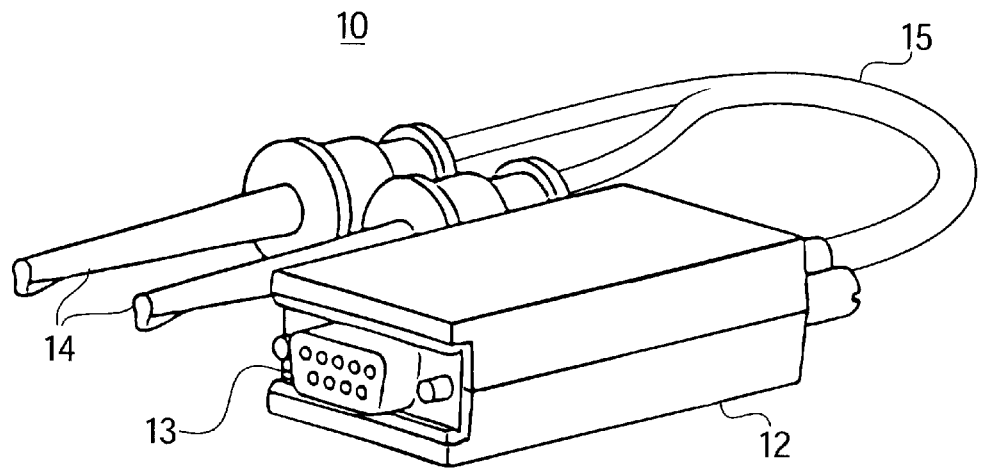
FIG. 1A is a perspective view of an interface device in accordance with the present invention.

FIG. 1A is a perspective view of a device 10 for interfacing a computer to a Fieldbus system in accordance with the present invention. The interface device 10 comprises an interface circuit unit 12, with a serial port connector 13, and two connectors 14 coupled to the circuit unit 12 via a cable 15.

The circuit unit 12 contains the circuitry, which is described more fully below, of the interface device 10. The circuit unit 12 can be compact in size, measuring approximately 1½ inches in width, ¾ inch in height and 4¼ inches in length.

Figure 1B:
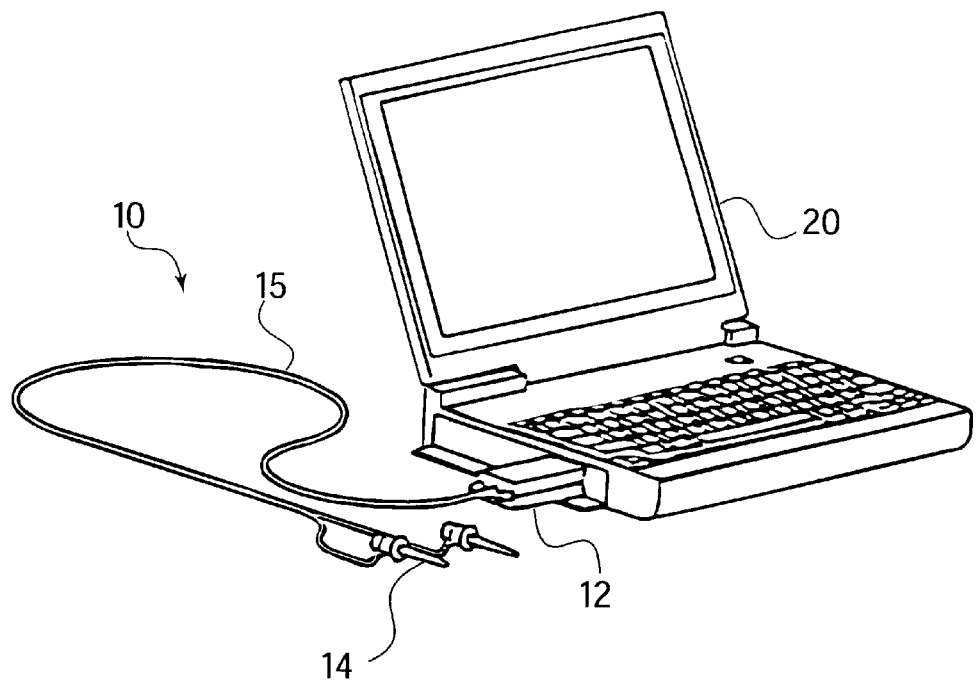
FIG. 1B is a perspective view of an interface device in accordance with the present invention plugged into the serial port of a computer.

The serial port connector 13, which is mounted on one end of the interface circuit unit 12, is used to connect the interface device 10 to a serial communication port of a computer 20, as shown in FIG. 1B. In the exemplary embodiment shown, the connector 13 is a 9-pin connector for coupling to an EIA RS-232-D serial port typically found on many desktop and portable personal computers. As shown in FIG. 1A, the circuit unit 12 is advantageously housed in a DB-9 connector shell.

As shown in the exemplary embodiment of FIG. 1A, the two connectors 14, which are used to couple the interface device 10 to a Fieldbus, are preferably of a clip-on variety, thereby allowing ready connection and disconnection to and from the wires of the Fieldbus.

Figure 2:
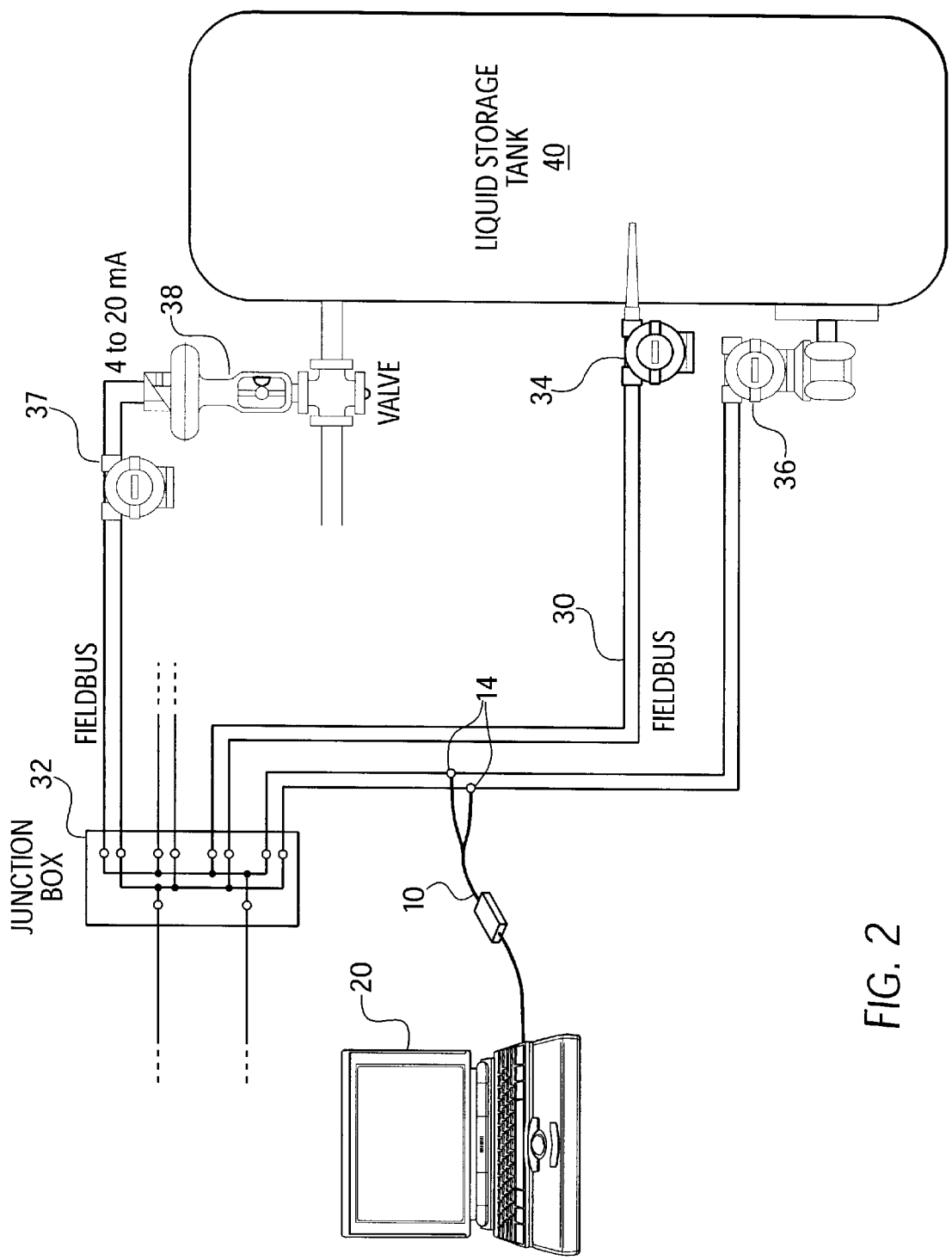
FIG. 2 is a schematic representation of a representative industrial process control Fieldbus system showing an interface device, in accordance with the present invention, coupled to the Fieldbus.

FIG. 2 is a schematic representation showing a computer 20 coupled to a Fieldbus 30 of a representative process control system via the interface device 10 of the present invention. In the representative system of FIG. 2, which is used to control and monitor a liquid storage tank 40, the Fieldbus 30 is connected to several components such as a junction box 32, a temperature sensor 34, a pressure sensor 36 and an interface 37 for a valve 38.

The junction box 32, is used to couple together multiple branches of a Fieldbus system, as shown in FIG. 2.

The temperature sensor 34, which is coupled to the Fieldbus 30, monitors the temperature of the liquid storage tank 40 and generates signals indicative of the temperature for transmission over the Fieldbus. A commercially available temperature sensor which can be used as the temperature sensor 34 is the TT302 temperature sensor manufactured by Smar Equipamentos Ind. Ltda. of Brazil.

The pressure sensor 36, which is coupled to the Fieldbus 30, monitors the pressure of the storage tank 40 and generates signals indicative of the pressure for transmission over the Fieldbus. A commercially available pressure sensor which can be used for such a purpose is the LD302 pressure sensor manufactured by Smar Equipamentos Ind. Ltda.

The interface 37, which serves to convert between digital Fieldbus signals and analog 4–20 mA signals, is used to control a valve 38. The valve 38 controls the flow of fluid into or out of the storage tank 40 in response to signals placed by a controlling device on the Fieldbus 30. The valve control signals are received by the interface 37 which, in response, generates a corresponding analog 4–20 mA control signal which controls the actuation of the valve 38. The interface 37 can be implemented using an FI302 Fieldbus interface module manufactured by Smar Equipamentos Ind. Ltda.

The interface device 10, which is connected to the serial port of the computer 20, is connected to the Fieldbus 30 via the connectors 14, each of which is connected to each one of the two wires of the Fieldbus 30. The interface device 10 allows the computer 20 to transmit and receive signals on the Fieldbus 30. As a result, the computer 20 can monitor signals generated by sensors such as the temperature sensor 34 and the pressure sensor 36. The computer 20 can also generate control signals to control devices such as the valve 38, which is coupled to the Fieldbus 30 via the interface 37.

Figure 3:
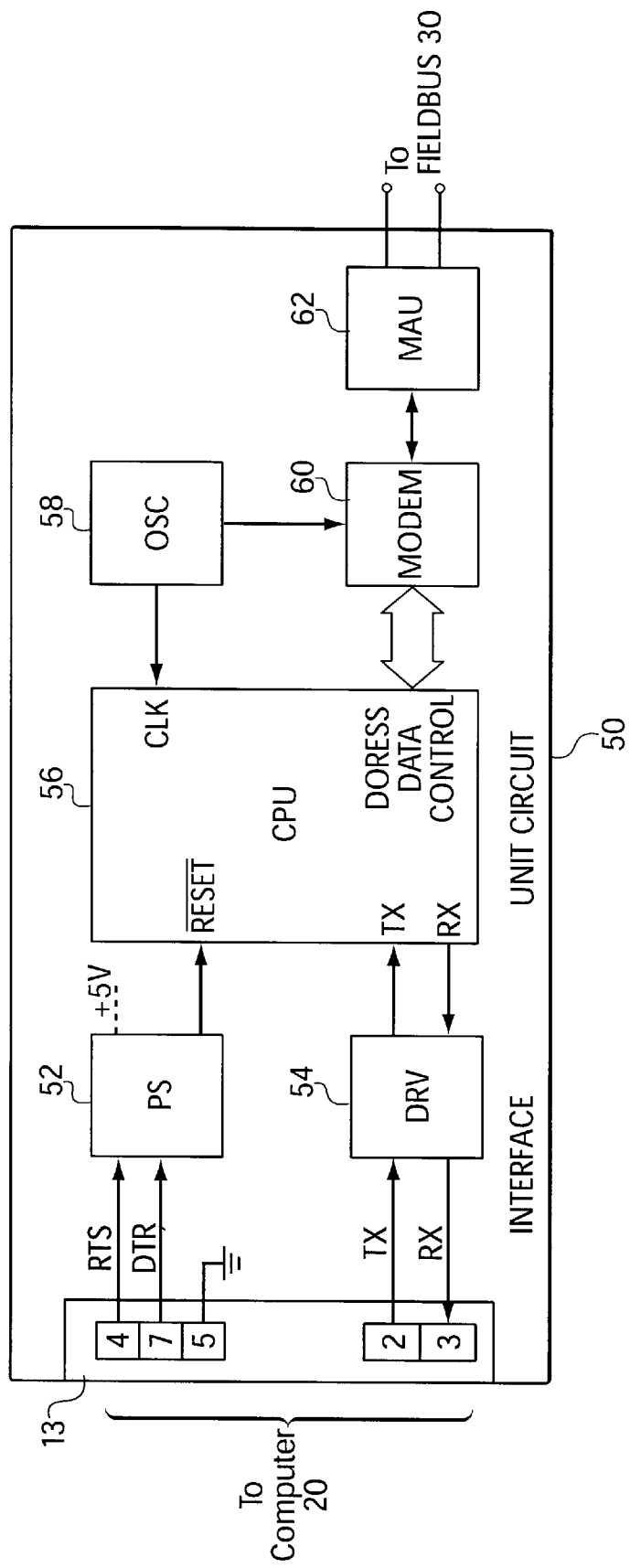
FIG. 3 is a block diagram of a circuit for an interface device implemented in accordance with the present invention.

The interface device 10 of the present invention will now be described in greater detail with reference to FIG. 3. FIG. 3 is a block diagram of a circuit 50 for the interface device of the present invention. The circuit 50 resides within the interface circuit unit 12 and comprises a power supply 52, a driver 54, a central processing unit (CPU) 56, an oscillator 58, a modem 60 and a medium attachment unit (MAU) 62. At one end of the circuit 50, the power supply 52 and driver 54 are connected to selected pins of the serial port connector 13. At the other end of the circuit 50, the MAU 62 is connected to the connectors 14 for connection to a Fieldbus.

The power supply 52 provides a stabilized 5 volt DC power output for powering the other components of the interface circuit 50. The power supply 52 generates its stabilized 5 volt DC output from power drawn from the serial port of the computer 20 to which the interface device 10 is coupled. The power requirement of the interface device 10 is low enough so that any personal computer, including a laptop or a notebook computer, can provide the necessary power from a serial port. The typical power consumption for the interface device 10 is approximately 60 mW (i.e., 12 mA at 5 volts), which may be similar to that of a conventional serial port mouse.

The power supply 52 is connected to pins 4 and 7 of the connector 13 which correspond, respectively, to the request to send (RTS) and data terminal ready (DTR) signals on the RS-232-D interface between the computer 20 and the interface device 10. The power supply 52 draws power from both the RTS and DTR lines which, when asserted by the computer 20, have voltage levels in the range of 5 to 12 volts. During conventional operation under the RS-232 interface protocol, the RTS signal is asserted by the computer 20 to request permission from the interface device 10 to send data to the interface device and the DTR signal is asserted by the computer 20 to indicate to the interface device 10 that the computer is ready to accept data from the interface device. The conventional operation of the RTS and DTR signals, however, can be modified under software control so that the computer 20 continuously asserts both the RTS and DTR signals whenever the computer 20 is communicating with the interface device 10. The computer 20 is operated in such a manner when the interface device 10 is connected thereto.

Because the interface device 10 is powered entirely from the computer 20, the interface device 10 does not need to draw any power from the Fieldbus to which it is connected. As such, the interface device 10 does not load down the Fieldbus when it is coupled thereto. Moreover, there is no need to provide the interface device 10 with power from an additional power source such as a battery or an AC power line.

The power supply 52 also generates a reset signal for resetting the CPU S6. The reset signal is pulled low when power is removed from the interface device 10 and is held low for a predetermined amount of time after the reapplication of power, thereby ensuring that the CPU begins to operate from a known initial state. The predetermined amount of time that the reset signal is held low is equal to or greater than the time required for the power supplied to stabilize.

The power supply 52 is implemented using conventional, commercially available power supply components.

The CPU 56 provides the intelligence of the interface device 10 for processing data in accordance with the Fieldbus protocol. On one side, the CPU 56 is in bidirectional communication with the computer 20 via the RS-232-D interface and the driver 54. In an exemplary embodiment of the interface device, the serial interface between the computer 20 and the interface device is operated at 57.6 kbps. On the other side, the CPU 56 is in bidirectional communication with the Fieldbus via the modem 60 and the MAU 62. In the exemplary embodiment, the CPU 56 is c lock ed by a 3.75 MHz clock signal generated by the oscillator 58.

The CPU 56 receives frames of serial data over the RS-232-D interface from the computer 20 and passes the data to the modem 60 for transmission over the Fieldbus. Each frame of data from the computer 20 comprises a control byte and 0 to 255 bytes of information. The CPU 56 also receives, from the modem 60, bytes of data received from the Fieldbus which the CPU formats into frames for transmission over the serial interface to the computer To minimize space requirements, the CPU 56 is preferably implemented as a single integrated circuit which incorporates features such as a random access memory (RAM), for storing program variables and for buffering frames of data, an electrically erasable programmable read-only memory (EEPROM) for storing the firmware used to run the CPU and a UART for communicating over the serial interface with the computer 20. Alternative nonvolatile memory devices, e.g., FLASH memory, may be used in place of the EEPROM. A commercially available device which can be used for the CPU 56 is the MC68HC11EIFU single-chip processor manufactured by Motorola which includes a 512-byte RAM and a 512-byte EEPROM.

The program used to run the CPU 56 is advantageously down-loaded to the EEPROM of the CPU from the computer 20. Using the EEPROM of the CPU 56 to store the program avoids the need to provide off-chip memory for this purpose. The MC68HC11EIFU processor is capable of entering a boot-strap mode during which the program can be down-loaded into the EEPROM. Once the programming is completed, the CPU 56 begins to operate, executing the program stored in its EEPROM. This down-loading operation need only be performed when the interface device 10 is first put into service or whenever its firmware needs to be revised.

The driver 54 is coupled to pins 2 and 3 of the serial port connector 13, which correspond, respectively, to the transmit data (TX) and receive data (RX) signal leads on the RS-232-D serial interface between the computer 20 and the interface device 10. The driver is also coupled to the TX and RX pins of the on-chip UART of the CPU 56. The driver 54 conditions the digital signals to and from the CPU 56 for transmission and reception on the RS-232-D serial interface. A commercially available component which can be used for the driver 54 is a DS1275 driver manufactured by Dallas Semiconductor.

The modem 60 converts data that has been formatted by the CPU 56 into Fieldbus-compatible signals. Conversely, the modem 60 also converts Fieldbus-compatible signals into data which the CPU 56 processes for transmission to the computer 20. The modem 60 is coupled to the CPU 56 over an 8-bit, bidirectional parallel data bus and is clocked by a 625 kHz clock signal generated by the oscillator 58. A commercially available component that can be used for the modem 60 is the FB2050R2 manufactured by Smar Equipamentos Ind. Ltda of Brazil.

The MAU 62 conditions signals to and from the modem 60 for communication over the Fieldbus. The MAU 62 converts and combines the signals to and from the modem 60 onto the two wires of the Fieldbus and presents the proper electrical termination (in terms of impedance, signal level, pulse shape, etc.) on the Fieldbus for the interface device 10. The MAU 62 includes a transformer (not shown) for coupling the interface device 10 to the Fieldbus while maintaining galvanic isolation therebetween. Fieldbus MAUs are well-known in the art. A detailed specification for Fieldbus MAUs is included as part of the Instrument Society of America's "Fieldbus Standard for Use in Industrial Control Systems, Part 2: Physical Layer Specification and Service Definition", pp. 38–51, 1992.

What is claimed is:

1. An interface device for interfacing a computer with a Fieldbus, comprising:

a serial port connector for connecting the interface device to a serial port of the computer;

a power supply coupled to the serial port connector for generating, from power supplied by the computer, a stabilized DC voltage for powering the interface device;

a processor coupled to the serial port connector for processing data from the computer and the Fieldbus for communication to the Fieldbus and the computer, respectively; and a medium attachment unit (MAU) coupled to the processor for connecting to the Fieldbus and for providing predetermined electrical characteristics for signals transmitted to and received from the Fieldbus.

2. The interface device of claim 1, comprising a modem coupled between the processor and the MAU for modulating data from the processor for transmission over the Fieldbus and for demodulating signals from the Fieldbus for processing by the processor.

3. The interface device of claim 2, comprising a housing for housing the interface device, wherein the housing is smaller than 6 inches by 6 inches by 6 inches.

4. The interface device of claim 3, wherein the serial port of the computer is an RS-232 serial port.

5. The interface device of claim 1, wherein the interface device draws substantially zero power from the Fieldbus.

6. The interface device of claim 1, wherein the processor includes a serial communications device which is coupled to the serial port connector for communicating with the computer.

7. The interface device of claim 1, wherein the processor includes an electrically erasable programmable read-only memory (EEPROM).

8. The interface device of claim 7, comprising a driver coupled between the serial port connector and the processor for conditioning signals communicated between the interface device and the computer.

9. The interface device of claim 8, comprising an oscillator for generating clock signals for the processor and the modem.

10. The interface device of claim 7, wherein the processor is packaged in a single integrated circuit.

11. The interface device of claim 10, wherein the processor executes software during operation, the software being maintained in the EEPROM when power is discontinued.

12. The interface device of claim 7, comprising two clip-on connectors for connecting the interface device to the Fieldbus.

13. The interface device of claim 1, wherein the interface device is only partially powered from the Fieldbus.

14. The interface device of claim 1, wherein the processor includes a nonvolatile programmable memory.

15. The interface device of claim 14, wherein the nonvolatile memory is flash memory.

16. An interface device for interfacing a computer with a Fieldbus, comprising:

a serial port connector for connecting the interface device to a serial port of the computer;

a processor coupled to the serial port connector for processing data from the computer and the Fieldbus for communication to the Fieldbus and the computer, respectively;

a medium attachment unit (MAU) coupled to the processor for connecting to the Fieldbus and for providing predetermined electrical characteristics for signals transmitted to and received from the Fieldbus;

a modem coupled between the processor and the MAU for modulating data from the processor for transmission over the Fieldbus and for demodulating signals from the Fieldbus for processing by the processor; and a housing for housing the interface device, wherein the housing is smaller than 5 inches by 6 inches by 1.5 inches.

17. The interface device of claim 16, wherein the processor includes:

nonvolatile means for storing a program to be executed by the processor.

18. The interface device of claim 17, further comprising:

a power supply coupled to the serial port connector for generating, from power supplied by the computer, a stabilized DC voltage for powering the interface device.

19. An interface device for interfacing a computer with a Fieldbus, comprising:

a serial port connector for connecting the interface device to a serial port of the computer;

means for generating, from power supplied by the computer, a stabilized DC voltage for powering the interface device coupled to the serial port connector;

a processor coupled to the serial port connector for processing data from the computer and the Fieldbus for communication to the Fieldbus and the computer, respectively; and a modem coupled to the processor for modulating data from the processor for transmission over the Fieldbus and for demodulating signals from the Fieldbus for processing by the processor.

* * * * *